United States Patent
Bauer

(10) Patent No.: US 7,442,723 B2
(45) Date of Patent: Oct. 28, 2008

(54) INKJET INK, INK SET AND METHOD OF PRINTING

(75) Inventor: Richard Douglas Bauer, Kennett Square, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 370 days.

(21) Appl. No.: 10/935,028

(22) Filed: Sep. 7, 2004

(65) Prior Publication Data

US 2005/0065235 A1    Mar. 24, 2005

Related U.S. Application Data

(60) Provisional application No. 60/501,482, filed on Sep. 8, 2003.

(51) Int. Cl.
*C09D 11/10*     (2006.01)
*C08L 39/04*     (2006.01)

(52) U.S. Cl. ............... 523/160; 523/161; 524/555; 524/815; 106/31.75; 106/31.76

(58) Field of Classification Search ......... 523/160, 523/161
See application file for complete search history.

(56) References Cited

U.S. PATENT DOCUMENTS

| | | | |
|---|---|---|---|
| 3,642,502 A | 2/1972 | Schneider | |
| 3,700,623 A | 10/1972 | Keim | |
| 3,772,076 A | 11/1973 | Keim | |
| 4,298,639 A | 11/1981 | Van Eenam | |
| 4,298,715 A | 11/1981 | Van Eenam | |
| 4,341,887 A | 7/1982 | Buriks et al. | |
| 4,402,748 A * | 9/1983 | Killat et al. | 106/31.28 |
| 4,694,302 A | 9/1987 | Hackleman et al. | |
| 5,085,698 A | 2/1992 | Ma et al. | |
| 5,231,131 A | 7/1993 | Chu et al. | |
| 5,367,005 A * | 11/1994 | Nachfolger | 523/403 |
| 5,510,004 A | 4/1996 | Allen | |
| 5,519,085 A | 5/1996 | Ma et al. | |
| 5,554,739 A | 9/1996 | Belmont | |
| 5,571,311 A | 11/1996 | Belmont et al. | |
| 5,609,671 A | 3/1997 | Nagasawa | |
| 5,648,405 A * | 7/1997 | Ma et al. | 523/160 |
| 5,672,198 A | 9/1997 | Belmont | |
| 5,698,016 A | 12/1997 | Adams et al. | |
| 5,707,432 A | 1/1998 | Adams et al. | |
| 5,713,993 A | 2/1998 | Grezzo Page et al. | |
| 5,718,746 A | 2/1998 | Nagasawa et al. | |
| 5,747,562 A * | 5/1998 | Mahmud et al. | 523/215 |
| 5,749,950 A | 5/1998 | Mahmud et al. | |
| 5,750,594 A | 5/1998 | Page et al. | |
| 5,801,738 A | 9/1998 | Stoffel et al. | |
| 5,803,959 A | 9/1998 | Johnson et al. | |
| 5,837,045 A | 11/1998 | Johnson et al. | |
| 5,846,307 A | 12/1998 | Nagasawa et al. | |
| 5,851,280 A | 12/1998 | Belmont et al. | |
| 5,861,447 A | 1/1999 | Nagasawa et al. | |
| 5,885,335 A | 3/1999 | Adams et al. | |
| 5,895,522 A | 4/1999 | Belmont et al. | |
| 5,911,815 A * | 6/1999 | Yamamoto et al. | 106/31.27 |
| 5,922,118 A | 7/1999 | Johnson et al. | |
| 5,928,419 A | 7/1999 | Uemura et al. | |
| 5,976,233 A | 11/1999 | Osumi et al. | |
| 6,020,397 A | 2/2000 | Matzinger | |
| 6,040,358 A | 3/2000 | Page et al. | |
| 6,057,384 A | 5/2000 | Nguyen et al. | |
| 6,099,632 A | 8/2000 | Nagasawa et al. | |
| 6,123,759 A | 9/2000 | Mise et al. | |
| 6,153,001 A | 11/2000 | Suzuki et al. | |
| 6,197,880 B1 | 3/2001 | Nigam | |
| 6,221,141 B1 | 4/2001 | Takada et al. | |
| 6,221,142 B1 | 4/2001 | Wang et al. | |
| 6,221,143 B1 | 4/2001 | Palumbo | |
| 6,277,183 B1 | 8/2001 | Johnson et al. | |
| 6,281,267 B2 | 8/2001 | Parazak | |
| 6,291,023 B1 | 9/2001 | Nigam | |
| 6,329,446 B1 | 12/2001 | Sacripante et al. | |
| 6,332,919 B2 | 12/2001 | Osumi et al. | |
| 6,342,095 B1 * | 1/2002 | Takizawa et al. | 106/31.27 |
| 6,375,317 B1 | 4/2002 | Osumi et al. | |
| 6,429,267 B1 | 8/2002 | Riehle | |
| 6,503,307 B1 | 1/2003 | Noguchi | |
| 7,015,259 B2 * | 3/2006 | Kataoka et al. | 523/160 |
| 2001/0035110 A1 | 11/2001 | Kato | |
| 2002/0156153 A1 | 10/2002 | Tsang et al. | |
| 2003/0059636 A1 | 3/2003 | Nigam | |

(Continued)

FOREIGN PATENT DOCUMENTS

EP        0 556 649 B1    8/1993

(Continued)

OTHER PUBLICATIONS

International Search Report.

*Primary Examiner*—Vasu Jagannathan
*Assistant Examiner*—Vickey Ronesi

(57) ABSTRACT

This invention pertains to an inkjet ink comprising a polyazetidinium groups-containing component, various ink sets comprising this ink, including one ink set with at least one co-reactive ink, and a method of printing with the ink and ink sets. When the inks are printed onto a substrate, the polyazetidinium groups can chemically react to enhance the durability of the printed image.

8 Claims, No Drawings

U.S. PATENT DOCUMENTS

2003/0087112 A1    5/2003    Nigam

FOREIGN PATENT DOCUMENTS

| | | |
|---|---|---|
| EP | 0 900 831 B1 | 3/1999 |
| EP | 1 086 997 A2 | 3/2001 |
| EP | 1 114 851 A1 | 7/2001 |
| EP | 1 122 286 A1 | 8/2001 |
| EP | 1 158 030 A2 | 11/2001 |
| EP | 1 167 471 A2 | 1/2002 |
| WO | WO 99/54144 | 10/1999 |
| WO | WO 01/10963 A1 | 2/2001 |
| WO | WO 01/25340 A1 | 4/2001 |
| WO | WO 01/94476 A2 | 12/2001 |
| WO | WO 05/026272 A1 | 3/2005 |

* cited by examiner

INKJET INK, INK SET AND METHOD OF PRINTING

CROSS-REFERENCE TO RELATED APPLICATION

This application claims priority under 35 U.S.C. §119 from U.S. Provisional Application Ser. No. 60/501,482 (filed Sep. 8, 2003), the disclosure of which is incorporated by reference herein for all purposes as if fully set forth.

BACKGROUND OF THE INVENTION

This invention pertains to an inkjet ink comprising, as a binder additive, a polyazetidinium groups-containing compound, an ink set comprising this ink and a second co-reactive ink, and a method of printing with the ink and ink set. The co-reactive components of the ink set, when the inks are printed onto a substrate, chemically react to enhance the durability of the printed image.

Inkjet printing is a non-impact printing process in which droplets of ink are deposited on print media, such as paper, to form the desired image. The droplets are ejected from a printhead in response to electrical signals generated by a microprocessor. Inks used in such recording are subject to rigorous demands including, for example, good dispersion stability, ejection stability, and good fixation to media.

Inkjet printers offer low cost, high quality printing and have become a popular alternative to other types of printers such as laser printers. However, inkjet printers are presently unable to match the speed of laser printers and the durability of the laser printed images. Inkjet prints with increased durabliity would be highly advantageous.

U.S. Pat. No. 4,694,302 describes a two-pen configuration wherein one pen contains aluminium chloride in aqueous vehicle and the second pen contains a colored ink with carboxymethyl cellulose (CMC) in aqueous vehicle. When jetted together on a substrate, an insoluble salt of CMC is formed, producing a protective coating. The print was reported to be very waterfast.

U.S. Pat. No. 6,020,397 describes an inkjet printing process wherein a first liquid comprising aziridine and a second liquid comprising a polymer reactive with aziridine are sequentially applied to a substrate, thereby forming an aziridine-crosslinked polymer. Good ink adhesion was reported.

U.S. Pat. No. 6,503,307 describes a set of liquid compositions wherein a first liquid comprises a first water-soluble compound having an ethylenically unsaturated double bond with an alpha-electron withdrawing group, and a second liquid comprises a second water-soluble compound having an active hydrogen addable to the first compound. Colorant can be present in either liquid. When printed together on a substrate, the first and second liquids can react to form a polymeric film. Water and abrasion resistance are reported to be excellent.

US 2002/0156153 describes a two-part fixative comprising (1) a reactive monomer or oligomer, selected from the group of isocyanates and epoxy-terminated oligomers, in a vehicle and (2) at least one second component, selected from polyols and polyvinyl alcohols, and base catalyst. The reactive monomer or oligomer reacts with the second component on the print medium to form a polymer. Water-, smear- and smudge-fastness are reported to be enhanced.

US 2003/0087112 describes treating compositions for a variety of substrates, the treating compositions containing a functional component selected from an azetidinium polymer, a guanidine polymer, a mixture of the two polymers, and a copolymer of an azetidinium monomer and a guanidine monomer. The so-treated substrates are said to be useful as substrates in conventional and digital (inkjet) printing processes. U.S. Pat. No. 6,291,023 further describes the use of these treating compositions as coating compositions for textile substrates, while US 2003/0059636 further describes the use of these treating compositions as sizing compositions for paper substrates. There is, however, no disclosure of an ink composition based upon the functional components disclosed in the aforementioned publications.

The disclosures of all of the above-identified publications are incorporated by reference herein for all purposes as if fully set forth.

Still there is a need for inks and printing methods that provide more physically durable inkjet images.

SUMMARY OF THE INVENTION

In accordance with one aspect, the present invention pertains to an aqueous inkjet ink comprising an aqueous vehicle and an azetidinium groups-containing component dispersed and/or dissolved in the aqueous vehicle, wherein the azetidinium groups-containing component comprises monomer, oligomer or polymer molecules, or mixtures of one or more thereof, possessing on average at least two azetidinium groups per molecule. The aqueous inkjet ink may be colored by further comprising a colorant, or may not contain a colorant (uncolored). If uncolored, the aqueous inkjet ink is preferably substantially clear so as to not impart any off color to a colored ink in an ink set.

In accordance with another aspect of the present invention, there is provided an ink set comprising at least three differently colored inks, wherein at least one of the inks is an aqueous inkjet ink as set forth above, and/or wherein the ink set further comprises another ink which is an non-colored inkjet ink as set forth above.

In accordance with another aspect of the present invention, there is provided another ink set comprising at least two inks, wherein at least one of the inks is an aqueous inkjet ink as set forth above, and wherein at least one other ink is a co-reactive aqueous ink comprises an aqueous vehicle and a co-reactive species containing one or more moieties reactive with the polyazetidinium groups.

In yet another aspect of the present invention, there is provided a method for ink jet printing onto a substrate, comprising the steps of:

(a) providing an ink jet printer that is responsive to digital data signals;

(b) loading the printer with a substrate to be printed;

(c) loading the printer with an ink as set forth above and described in further detail below, or an ink jet ink set as set forth above and described in further detail below; and (d) printing onto the substrate using the ink or inkjet ink set in response to the digital data signals.

Preferred substrates include plain paper and textiles.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

DETAILED DESCRIPTION OF THE PREFERRED EMBODIMENTS

Azetidinium Groups-Containing Component

By "azetidinium groups-containing component" is meant a composition of one or more monomer, oligomer or polymer molecules, or mixtures of one or more thereof, comprising on average at least two (2) azetidinium groups (substituted, unsubstituted or mixtures thereof) per molecule.

An azetidinium group is a four membered nitrogen-containing heterocycle, wherein the nitrogen is quaternized, and can be generally depicted by Formula (I):

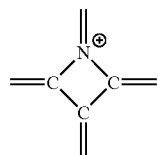

(I)

Note that the "double" bonds as depicted in Formula (I) are merely intended to reflect available substituent sites, as further exemplified below.

Due to the quaternized nitrogen, the azetidinium groups are cationic in nature and this should be taken into account in the formulation of these materials.

The carbons and nitrogens may be unsubstituted (hydrogen groups) or substituted depending on the particular molecule, albeit one of the nitrogen or opposite carbon (2-carbon) will be linked to or incorporated into a backbone or other bridging group to result in a molecule having at least two azetidinium groups. Molecules containing 2 or more azetidinium groups will be referred to as "polyazetidiniums".

In one embodiment, the polyazetidiniums comprise at least two units selected from the group consisting of Formula (II), Formula (III) and mixtures thereof:

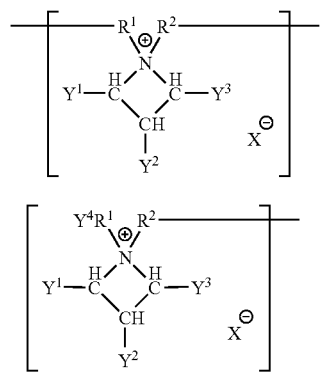

wherein:

$R^1$ and $R^2$ are independently an alkylene group containing 1 to 6 carbon atoms ("lower alkylene");

X is an anionic counterion;

$Y^1$, $Y^2$ and $Y^3$ are each independently selected from the group consisting of hydrogen, hydroxyl, halo, alkoxy, alkyl, amino, carboxy, acetoxy, cyano and sulfhydryl (the groups with carbon atoms preferably having from 1 to 24 carbon atoms); and $Y^4$ is a chain-terminating group.

Examples of chain-terminating groups include, but are not limited to, hydrogen, alkyl, alkoxy and acyloxy (the groups with carbon atoms preferably having from 1 to 24 carbon atoms).

Preferred are polymers wherein $R^1$ and $R^2$ are methylene. Preferred counterions, X, include hydrogen sulfate, methane sulfonate, dihydrogen phosphate, nitrate, perchlorate and halide. $Y^1$ and $Y^3$ are preferably independently hydrogen or lower alkyl (1 to 6 carbon atoms). $Y^2$ is preferably hydrogen or hydroxyl. Particularly preferred substituents are wherein $Y^1$ and $Y^3$ are hydrogen, and/or $Y^2$ is hydroxyl. With regard to the counterions, the ones mentioned are preferred because they have less tendency to react with the azetidinium moiety than the strongly nucleophilic co-reactive species.

In one preferred embodiment of a molecule containing groups (II) and/or (III), the polyazetidinium species can be a homopolymer or it can be a copolymer wherein one or more non-azetidinium monomer units are incorporated into backbone structure. The polymer may be essentially straight chain, or it may be branched or crosslinked.

Polyazetidiniums can prepared by the reaction of epichlorohydrin with polyamino compounds, oligomers or polymers containing secondary amine groups. Polyamines include polyaminoamides and polyalkylene polyamines.

Polyaminoamides can be prepared, for example, from diethylene triamine and a dicarboxylic acid such as adipic acid. Reaction of polyaminoamide polymers with epichlorohydrin can form azetidinium groups. The preparation of these sorts of polymers is described in U.S. Pat. No. 6,429,267 (the disclosure of which is incorporated by reference herein for all purposes as if fully set forth). A preferred resin is illustrated in Formula (IV)

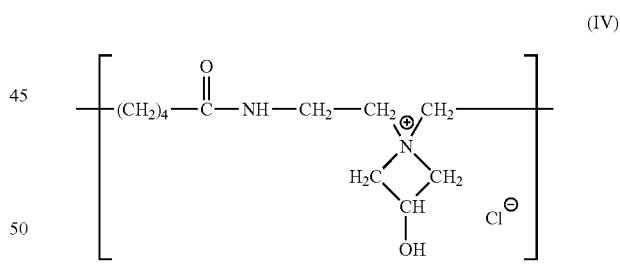

(IV)

An example of a commercial water-soluble poly(aminoamide)-epichlorohydrin resin is sold under the tradename Kymene® 557H (Hercules).

Polyalkylene polyamines can be made by polymerizing diallylamine. Subsequent reaction with epichlorohydrin can form azetidinium groups, as illustrated in below:

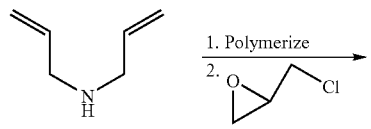

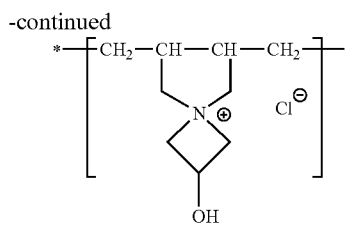

Preparation of these polymers is described in U.S. Pat. Nos. 3,700,623, 3,772,076, 4,298,639 and 4,298,715, the disclosures of which are incorporated by reference herein for all purposes as if fully set forth. Alternatively, the diallylamine can be reacted first with epichlorohydrin and cyclized to the azetidinium monomer, and then polymerized or copolymerized with other unsaturated co-monomers. This approach is described in U.S. Pat. Nos. 4,341,887 and 5,510,004, the disclosures of which are also incorporated by reference herein for all purposes as if fully set forth.

Useful co-monomers include acrylamide, diallylamine, diallylamine hydrohalides, methyldiallylamine, methyldiallylamine hydrohalides, dimethyldiallylammonium halides, maleic acid, sodium vinylsulfonate, sodium acrylate, sodium methacrylate, N,N-dimethylaminoethylmethacrylate, dimethylaminoethylacrylate, sodium salt of 2-acrylamido-2-methyl-1-propanesulfonic acid, N-vinyl-2-pyrrolidinone, N-vinylformamide, N-vinylacetamide, vinyl acetate, 2-vinylpyridine, 4-vinylpyridine, 4-styrenesulfonic acid, hydroxyethyl methacrylate, hydroxypropyl methacrylate, hydroxyethyl acrylate, hydroxypropyl acrylate, glycidyl acrylate, glycidyl methacrylate and the like. The level of unsaturated comonomer present in the copolymers expressed as a mole fraction of N,N-diallyl-3-hydroxy azetidinium halide plus unsaturated co-monomer can be from about 10 to about 85 mole percent.

Residual secondary amine groups on the polymer can self crosslink with azetidinium groups on other chains thereby rendering the polymer unstable upon storage. These undesirable side reactions can be prevented by adding acid to protonate the free secondary amine, or by adding alkylating agents such as methyl halide or dimethyl sulfate to alkylate the secondary amine groups to tertiary amines or quaternary groups. Another stabilization method is the addition of formaldehyde. Yet another stabilization method is the addition of metal ions such as aluminum, zinc, calcium, chromium, iron, magnesium and lithium, that can complex with the amines.

Other routes to oligomers and polymers containing azetidinium groups have been published. The synthesis of poly(acrylic esters) and poly(methacrylic esters) of 1-alkyl-3-hydroxy azetidines and their corresponding azetidinium salts, as illustrated by Formula (IV) below, has been described by Bogaert, Goethals and Schacht, *Makromolecular Chemie*, 182, 2687 (1981) (the disclosure of which is incorporated by reference herein for all purposes as if fully set forth).

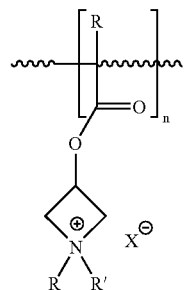
(V)

wherein R is H or $CH_3$, and R' and R" are each individually an alkyl group, preferably having 1 to 24 carbon atoms. These polymers are said to be stable and therefore could be useful in the present invention.

Further reference may also be made to previously incorporated U.S. Pat. No. 6,291,023, US 2003/0059636 and US 2003/087112.

Aqueous Inkjet Ink

As indicated previously, the aqueous inkjet inks of the present invention comprise an aqueous vehicle and an azetidinium groups-containing component dispersed and/or dissolved in the aqueous vehicle. The aqueous inkjet ink may be colored by further comprising a colorant, or may not contain a colorant (uncolored). If uncolored, the aqueous inkjet ink is preferably substantially clear.

The azetidinium groups-containing component may be present in the ink in one or more different capacities for a variety of functions. For example, the azetidinium groups-containing component can be present as a polymeric dispersant for insoluble colorants (such as pigments) or other insoluble ink components. Thus azetidinium-containing oligomers and polymers described herein could be used to prepare reactive cationic pigment dispersions. The azetidinium group-containing component might also be a present as self-dispersed pigment particles with multiple pendant azetidinium groups. Such an SDP dispersion could be prepared, for example, by treating an aqueous dispersion of self-dispersed pigment particles containing pendant secondary amine groups with epichlorohydrin, in a fashion analogous to the polymer preparation. The azetidinium groups-containing component can also be present as an "additive" functioning as a surfactant to assist in ink stability, substrate wetting and/or bleed control, and/or as a binder to improve the durability of printed images.

Aqueous Vehicle

The term "aqueous vehicle" refers to water or a mixture of water and at least one water-soluble organic solvent (co-solvent). Selection of a suitable mixture depends on requirements of the specific application, such as desired surface tension and viscosity, the selected colorant, drying time of the ink, and the type of substrate onto which the ink will be printed. Representative examples of water-soluble organic solvents that may be selected are disclosed in U.S. Pat. No. 5,085,698 (the disclosure of which is incorporated by reference herein for all purposes as if fully set forth).

If a mixture of water and a water-soluble solvent is used, the aqueous vehicle typically will contain about 30% to about 95% water with the balance (i.e., about 70% to about 5%) being the water-soluble solvent. Preferred compositions contain about 60% to about 95% water, based on the total weight of the aqueous vehicle.

The amount of aqueous vehicle in the ink is typically in the range of about 70% to about 99.8%, and preferably about 80% to about 99.8%, based on total weight of the ink.

The aqueous vehicle can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. 1,2-Alkanediols are preferably 1,2-C4-6 alkanediols, most preferably 1,2-hexanediol. Suitable surfactants include ethoxylated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont).

The amount of glycol ether(s) and 1,2-alkanediol(s) added must be properly determined, but is typically in the range of from about 1 to about 15% by weight and more typically about 2 to about 10% by weight, based on the total weight of the ink. Surfactants may be used, typically in the amount of about 0.01 to about 5% and preferably about 0.2 to about 2%, based on the total weight of the ink.

Colorant

Colorants can be soluble in the aqueous vehicle (dyes) or dispersed (pigments). In some cases, dyes can be encapsulated in a polymer matrix and dispersed like a pigment.

Traditionally, raw pigment is stabilized to dispersion in an aqueous vehicle by means of dispersing agents, such as polymeric dispersants or surfactants. More recently though, so-called "self-dispersible" or "self-dispersing" pigments (hereafter "SDP") have been developed. As the name would imply, SDPs are dispersible in water, or aqueous vehicle, without dispersants. See, for example, U.S. Pat. Nos. 5,554,739, 5,571,311, 5,609,671, 5,672,198, 5,698,016, 5,707,432, 5,718,746, 5,747,562, 5,749,950, 5,803,959, 5,837,045, 5,846,307, 5,851,280, 5,861,447, 5,885,335, 5,895,522, 5,922,118, 5,928,419, 5,976,233, 6,057,384, 6,099,632, 6,123,759, 6,153,001, 6,221,141, 6,221,142, 6,221,143, 6,277,183, 6,281,267, 6,329,446, 6,332,919, 6,375,317, US 2001/0035110, EP-A-1086997, EP-A-114851, EP-A-1158030, EP-A-1167471, EP-A-1122286, WO01/10963, WO01/25340 and WO01/94476, the disclosures of which are incorporated by reference herein for all purposes as if fully set forth.

Preferably, when a dispersant is employed, the dispersant(s) is a random or structured polymeric dispersant. Preferred random polymers include acrylic polymer and styrene-acrylic polymers. Most preferred are structured dispersants, which include AB, BAB and ABC block copolymers, branched polymers and graft polymers. Some useful structured polymers are disclosed in U.S. Pat. No. 5,085,698, EP-A-0556649 and U.S. Pat. No. 5,231,131, the disclosures of which are incorporated by reference herein for all purposes as if fully set forth.

The hydrophillic groups imparting solubility or dispersibility to the colorant can be ionic or non-ionic. Generally, ionic hydrophillic groups are most preferred.

The pigment dispersions in the preceding references are predominately anionic. Examples of cationic polymer-stabilized pigment dispersions include those made with GTP block polymers of methyl methacrylate and dimethylaminoethylmethacrylate or benzyl methacrylate and dimethylaminoethylmethacrylate neutralized with strong acids e.g., nitric, phosphoric, hydrochloric, or toluene sulfonic acids; or the same polymers that have been quaternized with benzyl chloride, dimethyl sulfate, or methyl chloride. The preparation of such pigment dispersions is described in U.S. Pat. Nos. 5,801,738, 5,750,594 and 5,713,993 (the disclosures of which are incorporated by reference herein for all purposes as if fully set forth). Dry and presscake pigments that can be used to prepare these dispersions are listed in previously incorporated U.S. Pat. No. 5,085,698. Examples of cationic self-dispersed pigments include those with pendant tertiary amine groups neutralized with strong acids e.g., nitric, phosphoric, hydrochloric, or toluene sulfonic acids, or pendant quaternized amine groups. The preparation of such pigments is described in U.S. Pat. Nos. 5,851,280 and 6,221,143 (the disclosures of which are incorporated by reference herein for all purposes as if fully set forth).

Suitable cationic dispersants may also include azetidinium groups-containing polymers as described above.

The pigment particles should be sufficiently small to permit free flow of the ink through the inkjet-printing device, especially at the ejecting nozzles that usually have a diameter ranging from about 10 microns to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss. The range of useful particle size is about 0.005 micron to about 15 micron. Preferably, the pigment particle size should range from about 0.005 to about 5 micron and, most preferably, from about 0.005 to about 1 micron.

Raw pigment colorant may be in dry or wet form. Pigments are usually manufactured in aqueous media and the resulting pigment is obtained as water-wet presscake. In presscake form, the pigment is not agglomerated to the extent that it is in dry form. Thus, pigments in water-wet presscake form do not require as much deflocculation in the process of preparing the inks as dry pigments.

Representative commercial pigments in dry form include the following:

| Trade Name | Manufacturer | Color Index (CI) Pigment Name |
|---|---|---|
| Permanent Yellow DHG | Hoechst | Yellow 12 |
| Permanent Yellow GR | Hoechst | Yellow 13 |
| Permanent Yellow G | Hoechst | Yellow 14 |
| Permanent Yellow NCG-71 | Hoechst | Yellow 16 |
| Permanent Yellow NCG-71 | Hoechst | Yellow 16 |
| Permanent Yellow GG | Hoechst | Yellow 17 |
| Hansa Yellow RA | Hoechst | Yellow 73 |
| Hansa Brilliant Yellow 5GX-02 | Hoechst | Yellow 74 |
| Dalamar ® Yellow YT-858-D | Heubach | Yellow 74 |
| Hansa Yellow X | Hoechst | Yellow 75 |
| Novoperm ® Yellow HR | Hoechst | Yellow 83 |
| Chromophtal ® Yellow 3G | Ciba-Geigy | Yellow 93 |
| Chromophtal ® Yellow GR | Ciba-Geigy | Yellow 95 |
| Novoperm ® Yellow FGL | Hoechst | Yellow 97 |
| Hansa Brilliant Yellow 10GX | Hoechst | Yellow 98 |
| Permanent Yellow G3R-01 | Hoechst | Yellow 114 |
| Chromophtal ® Yellow 8G | Ciba-Geigy | Yellow 128 |
| Irgazin ® Yellow 5GT | Ciba-Geigy | Yellow 129 |
| Hostaperm ® Yellow H4G | Hoechst | Yellow 151 |
| Hostaperm ® Yellow H3G | Hoechst | Yellow 154 |
| L74-1357 Yellow | Sun Chem | |
| L75-1331 Yellow. | Sun Chem | |
| L75-2377 Yellow | Sun Chem. | |
| Hostaperm ® Orange GR | Hoechst | Orange 43 |
| Paliogen ® Orange | BASF | Orange 51 |
| Irgalite ® Rubine 4BL | Ciba-Geigy | Red 57:1 |
| Quindo ® Magenta | Mobay | Red 122 |
| Indofast ® Brilliant Scarlet | Mobay | Red 123 |
| Hostaperm .RTM. Scarlet GO | Hoechst | Red 168 |
| Permanent Rubine F6B | Hoechst | Red 184 |
| Monastral ® Magenta | Ciba-Geigy | Red 202 |
| Heliogen .RTM. Blue L 6901F | BASF | Blue 15:2 |
| Heliogen ® Blue NBD 7010 | BASF | |
| Heliogen ® Blue K 7090 | BASF | Blue 15:3 |

-continued

| Trade Name | Manufacturer | Color Index (CI) Pigment Name |
|---|---|---|
| Heliogen ® Blue L 7101F | BASF | Blue 15:4 |
| Paliogen ® Blue L 6470 | BASF | Blue 60 |
| Heucophthal ® Blue G, XBT-583D | Heubach | Blue 15:3 |
| Heliogen ® Green K 8683 | BASF | Green 7 |
| Heliogen ® Green L 9140 | BASF | Green 36 |
| Monastral ® Violet R | Ciba-Geigy | Violet 19 |
| Monastral ® Red B | Ciba-Geigy | Violet 19 |
| Quindo ® Red R6700 | Mobay | |
| Quindo ® Red R6713 | Mobay | |
| Indofast ® Violet | Mobay | Violet 23 |
| Monastral ®. Violet Maroon B | Ciba-Geigy | Violet 42 |
| Special Black 4A | Degussa | Black 7 |
| Sterling ® NS 76 Black | Cabot | Black 7 |
| Sterling ® NSX 76 | Cabot | Black 7 |
| Mogul L | Cabot | Black 7 |

Representative commercial pigments available in the form of a water-wet presscake include: Heucophthal® Blue BT-585-P, Toluidine Red Y (C.I. Pigment Red 3), Quindo® Magenta (Pigment Red 122), Magenta RV-6831 presscake (Mobay Chemical, Harmon Division, Haledon, N.J.), Sunfast.RTM. Magenta 122 (Sun Chemical Corp., Cincinnati, Ohio), Indo® Brilliant Scarlet (Pigment Red 123, C.I. No. 71145), Toluidine Red B (C.I. Pigment Red 3), Watchung® Red B (C.I. Pigment Red 48), Permanent Rubine F6B13-1731 (Pigment Red 184), Hansa® Yellow (Pigment Yellow 98), Dalamar® Yellow YT-839-P (Pigment Yellow 74, C.I. No.11741, Sunbrite.® Yellow 17 (Sun Chemical Corp, Cincinnati, Ohio), Toluidine Yellow G (C.I. Pigment Yellow 1), Pigment Scarlet (C.I. Pigment Red 60), Auric Brown (C.I. Pigment Brown 6), etc. Black pigments, such as carbon black, generally are not available in the form of aqueous presscakes.

Usual cationic dyes have a structural skeleton of cyanine, azo, azomethine, xanthene, triphenylmethane, methine, polymethine, phthalocyanine or the like. The cationic color dyes include C.I. Basic Yellow 1, C.I. Basic Yellow 11, C.I. Basic Yellow 13, C.I. Basic Yellow 19, C.I. Basic Yellow 21, C.I. Basic Yellow 25, C.I. Basic Yellow 33, C.I. Basic Yellow 36, C.I. Basic Red 1, C.I. Basic Red 2, C.I. Basic Red 9, C.I. Basic Red 12, C.I. Basic Red 13, C.I. Basic Red 38, C.I. Basic Red 39, C.I. Basic Red 92, C.I. Basic Blue 1, C.I. Basic Blue 3, C.I. Basic Blue 5, C.I. Basic Blue 9, C.I. Basic Blue 19, C.I. Basic Blue 24, C.I. Basic Blue 25, C.I. Basic Blue 26, C.I. Basic Blue 28, C.I. Basic Blue 45, C.I. Basic Blue 54, and C.I. Basic Blue 65. These dyes may be used in combination for preparation of a black ink.

Anionic dyes include Acid Yellow 11, Acid Yellow 17, Acid Yellow 23, Acid Yellow 25, Acid Yellow 29, Acid Yellow 42, Acid Yellow 49, Acid Yellow 61, Acid Yellow 71, Direct Yellow 12, Direct Yellow 24, Direct Yellow 26, Direct Yellow 44, Direct Yellow 86, Direct Yellow 87, Direct Yellow 98, Direct Yellow 100, Direct Yellow 130, Direct Yellow 86, Direct Yellow 132, Direct Yellow 142, Acid Red 1, Acid Red 6, Acid Red 8, Acid Red 32, Acid Red 35, Acid Red 37, Acid Red 51, Acid Red 52, Acid Red 80, Acid Red 85, Acid Red 87, Acid Red 92, Acid Red 94, Acid Red 115, Acid Red 180, Acid Red 254, Acid Red 256, Acid Red 289, Acid Red 315, Acid Red 317, Direct Red 1, Direct Red 4, Direct Red 13, Direct Red 17, Direct Red 23, Direct Red 28, Direct Red 31, Direct Red 62, Direct Red 79, Direct Red 81, Direct Red 83, Direct Red 89, Direct Red 227, Direct Red 240, Direct Red 242, Direct Red 243, Acid Blue 9, Acid Blue 22, Acid Blue 40, Acid Blue 59, Acid Blue 93, Acid Blue 102, Acid Blue 104, Acid Blue 113, Acid Blue 117, Acid Blue 120, Acid Blue 167, Acid Blue 229, Acid Blue 234, Acid Blue 254, Direct Blue 6, Direct Blue 22, Direct Blue 25, Direct Blue 71, Direct Blue 78, Direct Blue 86, Direct Blue 90, Direct Blue 106, Direct Blue 199.

The colorant in the polyazetidinium-containing ink must be compatible with the cationic polyazetidinium species. Preferably, the colorant in the polyazetidinium-containing ink is cationic. Sulfonated acid and direct dyes are possible colorants in the ink to the extent that they can exist in along with the azetidinium species without precipitating it through electrostatic interaction. The sulfonium group is, however, a sufficiently poor nucleophile so as to not chemically react with the azetidinium group in solution.

Other Ingredients

Other ingredients may be formulated into the inkjet ink, to the extent that such other ingredients do not interfere with the stability and jetablity of the ink, which may be readily determined by routine experimentation. Such other ingredients are in a general sense well known in the art.

Biocides may be used to inhibit growth of microorganisms.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N'',N''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

The inks can contain compatible polymers other than the polyazetidinium and coreactive species. The oligomers or polymers can be based on acrylic, urethane, polyester, polyamide, polyvinyl, polyether, polyamine and cellulosic structures; the polymer or oligomer structures could include random, block, branched, star, or dendrimer structures. They can be soluble, or present as a dispersion, latex or hydrosol. The latex or dispersion particles can have a homogeneous or core shell structure.

The inks can also contain multivalent metal cations to help to stabilize the azetidinium species as already mentioned earlier, as well as enhance the ability of the liquid to precipitate anionic co-reactive inks.

Ink Properties

Drop velocity, separation length of the droplets, drop size and stream stability are greatly affected by the surface tension and the viscosity of the ink. Ink jet inks typically have a surface tension in the range of about 20 dyne/cm to about 70 dyne/cm at 25° C. Viscosity can be as high as 30 cP at 25° C. (30 cP or less), but is typically somewhat lower. The ink has physical properties are adjusted to the ejecting conditions and printhead design. The inks should have excellent storage stability for long periods so as not clog to a significant extent in an ink jet apparatus. Further, the ink should not corrode parts of the inkjet-printing device it comes in contact with, and it should be essentially odorless and non-toxic.

The ink set of this invention can be particularly advantageous for applications where low viscosity is required. Thus the viscosity (at 25° C.) of the inventive inks can be less than about 7 cps, or less than about 5 cps, and even less than about 3.5 cps.

Ink Sets

One of the ink sets in accordance with the present invention preferably comprises at least three differently colored inks (such as CMY), and preferably at least four differently colored inks (such as CMYK), wherein at least one of the inks is an aqueous inkjet ink as described above, containing the azetidinium groups-containing component.

Alternatively, the ink containing the azetidinium groups-containing component does not contain any colorant meaning that, in addition to the colored inks described above, the ink set will further comprise another ink which is an non-colored inkjet ink comprising an aqueous vehicle and an azetidinium groups-containing component.

The other inks of the ink set are preferably also aqueous inks, and may contain dyes, pigments or combinations thereof as the colorant. Such other aqueous inks are based on aqueous vehicles and other components and additives as described above and may, in a general sense, be considered known to those of ordinary skill in the art.

Co-Reactive Ink Sets

The instant invention further pertains to an inkjet ink set comprising at least a first and second ink, wherein said first ink comprises a first aqueous vehicle and a polyazetidinium species, and said second ink comprises a second aqueous vehicle and a "co-reactive" species. The "co-reactive" species is so designated because it contains one or more moieties that chemically react with the azetidinium moieties of the polyazetidinium species to form a covalent bond. When the first and second ink are jetted together on the printed substrate, the co-reactive species reacts with the polyazetidinium species. Preferably the co-reactive species comprises a plurality of co-reactive groups so that reaction with the polyazetidinium species yields an at least partially crosslinked polymer which imparts durability to the printed image. The reaction can generally be accelerated by elevated temperature, but heating is not necessary as reaction will preferably also take place at acceptable rates at ambient temperature.

Either one or both of the first and second inks can further comprise colorant. In the case where the first and second inks contain no colorant, application is generally in the form of an overcoat. Typically though, at least one of the inks will contain colorant. Generally, the ink set will comprise at least three inks with colorant and at least one ink without colorant. The ink without colorant will contain either the polyazetidinium species or the co-reactive species, and the inks with colorant will contain the companion species not contained in the ink without colorant.

Colorant in the co-reactive ink will, in general, be anionic or neutral. When the hydrophillic groups on the colorant are also azetidinium-reactive (e.g. carboxylate or amines), the colorant can also serve as (one of) the co-reactive species.

The inks can also contain other ingredients as are well known in the art, and as described above. Adaptation of the ink formulation to a particular inkjet printer may be needed to provide an appropriate balance of properties such as, for instance, viscosity and surface tension.

Herein, reference to "durability" or "fastness" generally means the resistance of the printed image to color removal including, for example, rub resistance (finger rub), water fastness (water drop), smear fastness (highlighter pen stroke) and crock fastness on textile.

Co-Reactive Species

A co-reactive species is a material comprised of at least one, preferably a plurality, of moieties reactive with azetidinium groups. These moieties include nucleophiles such as carboxyl, hydroxyl, phenolic, beta-diketone, thiol, and primary and secondary amine. They are generally most effective in their ionized form, e.g., carboxyl in the form of carboxylate, alkylhydroxyl in the form of alkoxide, and so forth. The reaction of azetidinium with a co-reactive nucleophile, e.g., carboxylate, is illustrated below:

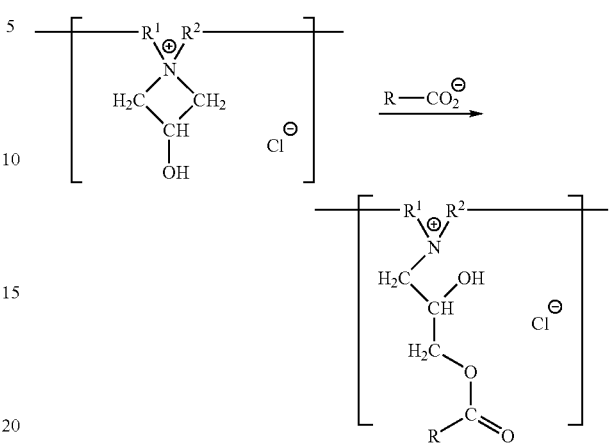

A co-reactive species, especially one with a plurality of azetidinium reactive moieties, would be unstable if mixed together with a polyazetidinium species in one ink. Thus, the co-reactive species and polyazetidinium species are jetted as separate inks, and mixing is accomplished on the printed substrate.

Co-reactive species comprising more than one azetidinium-reactive moiety can react with the polyazetidinium species to yield an at least partially, and preferably highly, crosslinked (durable) coating. The co-reactive species can be part of an oligomer or a polymer and can be soluble in the vehicle or dispersed (latex) as a separate phase. (For convenience, the term "latex" is used for all dispersed polymers, including those sometimes described as "emulsion polymers" and "hydrosols") The co-reactive moieties can be all of the same type or a mixture of two or more types. The oligomers or polymers from which the co-reactive moieties are pendent can be can be based on, for example, polyacrylic, polyurethane, polyester, polyamide, polyvinyl, polyether, polyamine and cellulosic structures. The polymer or oligomer structures include random, block, branched, star and dendrimer structures.

A co-reactive species can also be the colorant itself if it contains one or more groups that can react with azetidinium groups. As an example may be mentioned anionic SDPs.

Conjugate bases of a strong acids, for example, sulfate, sulfonate, perchlorate, nitrate, phosphate, phosphonate and the like, are weak nucleophiles and as such tend to be less reactive to azetidinium moieties and therefor less useful as co-reactive species.

Polyamine Co-Reactive Species

Monomeric polyamines suitable as co-reactive species include members selected from the group $NH_2(CH_2)_nNH_2$, where n is an integer from 2 to 8, such as ethylenediamine, propylene diamine, tetramethylene diamine, pentamethylene diamine, hexamethylene diamine, heptamethylene diamine and octamethylene diamine. Also included are members selected from the group $H_2NCH_2CH_2(NHCH_2CH_2)_nNH_2$, where n is an integer from 1 to 4, such diethylene triamine, triethylene tetramine and tetraethylene pentamine.

Representative polymeric polyamines useful as co-reactive species include polyethyleneimine, polyvinylamine, polydiallylamine, polyallylamine, poly(vinylamine-co-vinylalcohol) and polyaminoamides prepared by reaction of polyalkyene polyamines with aliphatic dicarboxylic acids. An example of the last is the polyaminoamide prepared by reaction of diethylene triamine with adipic acid.

Other useful polyamines include amine derivatives of a polyol, a polyethylene oxides and glycerin having a terminal amino group, including the compounds represented by structural formulas B-1 and B-2 described and illustrated in U.S. Pat. No. 6,503,307 (the disclosure of which is incorporated by reference herein for all purposes as if fully set forth). Also useful are polymers of ethylenimine, including the compounds represented by structural formula B-3 described and illustrated in previously incorporated U.S. Pat. No. 6,503, 307. Commercial products corresponding to these materials include Lupasol® FG, Lupasol® G20 waterfree, Lupasol® G20, Lupasol® G35 and Lupasol® WF (all of BASF Co.); and Epomin® SP-006, Epomin® SP-012, Epomin® SP-018, Epomin® SP-200, Epomin® PP-061 and Epomin® PP-1000 (all of Nippon Shokubai Kagaku K.K.).

Other useful polyamines can also include glucosamine; dimers of glucosamine; amino sugars of 3- to 10-mer of glucosamine; and oligomers of sugar structures, for example partial acetylation, having plural primary amino groups in the molecule. These compounds may be modified in the structure, provided that the modified compound is water-soluble. The specific examples are shown by structural formulas B-4 to B-7 described and illustrated in previously incorporated U.S. Pat. No. 6,503,307.

Polycarboxylate Co-Reactive Species

Suitable co-reactive species comprised of a plurality of carboxylic moieties include acrylic resins such as polyacrylic acid, acrylic acid-acrylonitrile copolymer, potassium acrylate-acrylonitrile copolymer, vinyl acetate-acrylate ester copolymers and acrylic acid-acrylate ester copolymers; styrene-acrylic resins such as styrene-acrylic acid copolymer, styrene-methacrylic acid copolymer, styrene-methacrylic acid-acrylate ester copolymers, styrene-alphamethylstyrene-acrylic acid copolymer, styrene-alpha-methylstyrene-acrylic acid-acrylate ester copolymers; styrene-maleic acid copolymer, styrene-maleic anhydride copolymer, vinyl naphthalene-acrylic acid copolymer, vinyl naphthalene-maleic acid copolymer; vinyl acetate copolymers such as vinyl acetate-ethylene copolymer, vinyl acetate-fatty acid vinyl ethylene copolymers, vinyl acetate-maleate ester copolymers, vinyl acetate-crotonic acid copolymer and vinyl acetate-acrylic acid copolymer; isobutylene-maleic acid resin; rosin-modified maleic acid resin; alginic acid derivatives; carboxymethyl cellulose or carboxymethyl starch; carboxylated polyester; and carboxylated cellulose acetate butyrate and salts thereof.

Poly-Beta-Diketones as Co-Reactive Species

Suitable co-reactive species comprised of a plurality of beta-diketone moieties include latex particles incorporating pendant beta-keto groups, such as the styrene, lauryl methacrylate, methacrylic acid and methacryloylacetone emulsion latex described in EP-A-0900831 (the disclosure of which is incorporated by reference herein for all purposes as if fully set forth). Also included are the water dispersible beta-diketone acrylic copolymers described in U.S. Pat. No. 6,040,358 (the disclosure of which is incorporated by reference herein for all purposes as if fully set forth), with about 5-40% by weight of a polymerizable beta-diketone and about 5-50% by weight of another polymerized moiety that renders the polymer soluble upon neutralization. Preferred beta-diketone monomers would include acetoacetoxy ethyl methacrylate, acetoacetamide ethyl methacrylate and methacryloylacetone.

Polythiols as Co-Reactive Species

Examples of useful water-soluble polythiol compounds are shown by structural formulas B-8 to B-17, described and illustrated in previously incorporated U.S. Pat. No. 6,503, 307.

Substrates

The substrate can be any suitable substrate including plain paper, treated paper, textile, and non-porous substrate including polymeric films such as polyvinyl choride and polyester.

If the substrate contains acidic moieties, reaction between the substrate and polyazetidiniums may occur as well.

Method of Printing

In applying the inventive inks, one ink can be jetted onto a substrate first, followed by the other, with some delay in between, or the inks could be applied virtually simultaneously. The sequence and timing will depend on the needs of the application. For example, on a porous substrate, there might be benefits to putting the azetidinium ink down first, followed by the co-reactive colored ink to limit the latter's penetration into the substrate. This could limit bleed and provide a chroma boost as well a more durable crosslinked layer. On an impermeable substrate, the co-reactive color might go down first followed by the azetidinium ink to provide maximum durability on the top of the printed layer. If the two inks are jetted virtually simultaneously, then the mixing of the two inks would be maximized and the whole layer would have more uniform crosslinking.

Specific Preferred Embodiments

Without limiting the general scope of present invention, the following are specific preferred embodiments:

1. An inkjet ink set comprising at least a first and second ink wherein said first ink comprises a first aqueous vehicle and a polyazetidinium species, and said second ink comprises a second aqueous vehicle and a co-reactive species containing one or more moieties reactive with the polyazetidinium species. Either one or both of the first and second inks can contain colorant.

2. An inkjet ink set comprising at least a first and second ink wherein said first ink comprises a first aqueous vehicle and a polyazetidinium species, and said second ink comprises a second aqueous vehicle and a co-reactive species, wherein the co-reactive species is soluble in the second aqueous vehicle. Preferably the co-reactive species comprises a plurality of moieties reactive with the polyazetidinium species, and the polyazetidinium reactive moieties are selected from group carboxyl, amine, thiol, beta-diketone and combinations thereof. Either one or both of the first and second inks can contain colorant.

3. An inkjet ink set comprising at least a first and second ink wherein said first ink comprises a first aqueous vehicle and a polyazetidinium species, and said second ink comprises a second aqueous vehicle and a co-reactive species, wherein the co-reactive species is a polymer (latex) dispersed in the second aqueous vehicle. Preferably the latex co-reactive species is ionically stabilized to dispersion. More preferably the latex is stabilized with anionic carboxylate moieties that are able to co-react with polyazetidinium species. The latex polymers are preferably selected from (styrene)acrylic and polyurethane polymers. Either one or both of the first and second inks can contain colorant 4. An inkjet ink set comprising at least a first and second ink wherein said first ink comprises a first aqueous vehicle and polyazetidinium species, and said second ink comprises a second aqueous vehicle, a pigment colorant dispersed therein, a co-reactive species containing one or more moieties reactive with the polyazetidinium species. The pigment colorant is preferably anionically stabilized, most preferably with anionic carboxyl moieties. The preferred pigment dispersions include, for example, pigment dispersed with acrylic polymer comprised of carboxylate groups, and SDP where the attached hydrophillic groups are comprised of carboxylates. When the anionic stability imparting groups on the pigment are moieties such as carboxyl, these can also serve, entirely or in part, as the co-reactive species with the polyazetidinium species.

5. An inkjet ink set comprising at least a first and second ink wherein said first ink comprises a first aqueous vehicle and polyazetidinium species, and said second ink comprises a second aqueous vehicle, a soluble colorant and a co-reactive species containing one or more moieties reactive with the polyazetidinium species. The soluble colorant (dye) is preferably anionic. When the dye is comprised of polyazetidinium reactive moieties, such as anionic carboxyl moieties, these can also serve, entirely or in part, as the coreactive species with the polyazetidinium species.

6. An inkjet ink set comprising at least a first and second ink wherein said first ink comprises a first aqueous vehicle, a pigment colorant and a polyazetidinium species, and said second ink comprises a second aqueous vehicle and a co-reactive species containing one or more moieties reactive with the polyazetidinium species. The pigment colorant is preferably cationically stabilized. The preferred pigment dispersions include, for example, pigment dispersed with cationic polymer and SDP where the attached hydrophillic groups are comprised of cationic groups. The second ink can further comprise anionic latex polymer.

7. In another embodiment, there is provided an ink set comprising a first ink comprising a first vehicle and a polyazetidinium species (with no colorant); a second ink comprising a magenta colorant, co-reactive species and second vehicle; a third ink comprising a yellow colorant, co-reactive species and third vehicle; and a fourth ink comprising a cyan colorant, co-reactive species and a fourth vehicle. Preferably the magenta, yellow and cyan colorant are pigments. Optionally, there is a fifth ink comprising a black colorant, co-reactive species and a fifth vehicle.

In some cases it can be advantageous for the co-reactive species to carry an anionic charge so that there is electrostatic attraction with the polyazetidinum species. The electrostatic interaction can help fix the colorant to the surface of the substrate for higher chroma, and also help provide better reaction between the co-reactive species and the polyazetidinium.

EXAMPLES

First Ink (Ink 1)

A colorless first ink comprising Kymene® 557H (Hercules) as the polyazetindium species was prepared according to the following recipe:

| Ink 1 - Ingredients | Weight Percent |
| --- | --- |
| Kymene ® 557H (solids basis) | 2.0 |
| Glycerol | 3.0 |
| Ethylene Glycol | 2.0 |
| 1,2-Hexanediol | 5.0 |
| BYK ® 348 (surfactant, Byk Chemie) | 0.1 |
| Water | Balance |

Second Ink (Ink 2)

A black co-reactive second ink with black pigment colorant was prepared according to the following recipe:

| Ink 2 - Ingredients | Weight Percent |
| --- | --- |
| Pigment dispersion (15% solids) | 4.50 |
| Glycerol | 9.0 |
| Ethylene Glycol | 6.0 |
| 1,2-Hexanediol | 5.0 |
| BYK ® 348 | 0.1 |
| Water | Balance |

The pigment dispersion was a polymer stabilized carbon black dispersion prepared in a manner similar to example 3 in U.S. Pat. No. 5,519,085 (the disclosure of which is incorporated by reference herein for all purposes as if fully set forth) except that the dispersant was a block copolymer with methacrylic acid/benzyl methacrylate//ethyltriethyleneglycol methacrylate (13//15/14). The pigment content was adjusted to be 15% by weight. The dispersant had a number average molecular weight of about 5,000 and weight average molecular weight of about 6,000 g/mol, and was prepared in a manner similar to "preparation 4" described in previously incorporated U.S. Pat. No. 5,519,085, except the monomer levels were adjusted to give the ratio indicated. In this second Ink example, the co-reactive species was the carboxylate-containing dispersant.

Print Test

The black pen of two Epson 3000 printers operating in the 1440 dpi mode was used to print test patterns ½ inch wide and 6 inches long onto Gilbert bond paper. The first ink was loaded into a cleaned pen of one printer and the second ink was loaded into a cleaned black pen of the other printer. The test page was printed first with one printer, then immediately fed into the other printer and overprinted with the other ink. The time between each pass was no more that about 15 seconds.

Four trials were made as follows:

| Trial | First Pass | Second pass | Third pass |
| --- | --- | --- | --- |
| 1 (comp.) | Ink 2 | None | None |
| 2 | Ink 2 | Ink 1 | None |
| 3 | Ink 1 | Ink 2 | None |
| 4 | Ink 1 | Ink 2 | Ink 1 |

Trial 1 was a comparative test and with colored ink and no other overcoat. In Trial 2, the colorant was applied first, followed by an overcoat of clear polyazetidinium-containing ink. In Trial 3, the clear polyazetidinium-containing ink was applied first followed by an overcoat with the colored ink containing the co-reactive species. In trial 4, three passes were made: an undercoat of clear polyazetidinium-containing ink, a coat color-containing the co-reactive species, and an overcoat with additional clear polyazetidinium-containing ink.

The test strip from each trial was cut into three equal parts and treated immediately after printing as follows:

a) Air dried at ambient temperature.

b) Oven dried at 120° C. for 10 minutes.

c) Passed under a focused radiant heater at 8 feet per minute, whereupon the temperature of the printed area reached about 250° C.

The type of post treatment for each strip is indicated by an "a", "b" or "c" after the trial number.

Each strip was given a double strike with a basic hi-liter (Avery #240XX) at 10 minutes after printing and 24 hours after printing, and rated for smear.

| Trial (treatment) | Optical Density | Smear Rating* at 10 min | Smear Rating* at 24 hours |
|---|---|---|---|
| 1(a) | 0.99 | 4 | 3 |
| 1(b) |  | 3 | 2 |
| 1(c) |  | 3 | 3 |
| 2(a) | 1.0 | 3 | 0 |
| 2(b) |  | 0 | — |
| 2(c) |  | 0 | — |
| 3(a) | 1.17 | 4 | 0 |
| 3(b) |  | 0 | — |
| 3(c) |  | 0 | — |
| 4(a) | 1.14 | 4 | 0 |
| 4(b) |  | 0 | — |
| 4(c) |  | 0 | — |

Smear was evaluated visually and rated as follows:
4 heavily smeared
3 some smearing
2 very slight amount of smearing
0 no smearing Not only did the azetidinium ink stop highlighter smear of the co-reactive black ink after heating, it did so even after the test print had stood overnight at room temperature. It was able to do this on the test print in trial 3 where the azetidinium ink was printed first as well as boosting the OD by 17%—visibly darker than the ink when printed alone. The black ink alone smeared after heating or heating and standing overnight.

Ink 3 (Comparative)

This ink was prepared as a comparative example to Ink 1 above. It comprised a polyquarternary cationic polymer, hydrolyzed-Kymene®450 (Hercules), without azetidinium crosslinking groups.

Kymene®450 is an amine amide polymer with pendent beta epichlorohydrin groups. Prior to use in Ink 3, the epichlorohydrin in the polymer was hydrolyzed to a diol form by treatment with KOH, thus providing a comparative quarternary cationic polymer 15 without reactive groups. The recipe for Ink 3 is shown in the table below. The Ink was allowed to stand for 72 hours and then adjusted to pH 5 with aqueous HCl.

| Ink 3 - Ingredients | Weight Percent |
|---|---|
| Hydrolyzed Kymene ® 450 (solids basis) | 2.0 |
| Glycerol | 9.0 |
| Ethylene Glycol | 5.0 |
| 1,2 hexanediol | 5.0 |
| BYK ® 348 (surfactant, Byk Chemie) | 0.1 |
| Water | Balance |

Print testing was performed the same as Trial 3 above, except comparative Ink 3 was used in place of Inventive Ink 1. The second ink was the same Ink 2. Results, Trials 5a, 5b and 5c, are summarized in the following Table.

| Trial (treatment) | Optical Density | Smear Rating* at 10 min | Smear Rating* at 24 hours |
|---|---|---|---|
| 5(a) | 1.08 | 4 | 3 |
| 5(b) |  | 4 | 3 |
| 5(c) |  | 4 | 3 |

There was an increase in optical density (relative to Ink 2 alone, Trial 1a) above, indicating the cationic polymer was present and acting as a "fixer". But, there was no substantial improvement in smear as there was with Ink 1. This demonstrates the benefits of inventive Ink 1 with crosslinkable azetidinium groups.

The invention claimed is:

1. An aqueous inkjet ink comprising an aqueous vehicle and an azetidinium groups-containing component dispersed and/or dissolved in the aqueous vehicle, wherein the azetidinium groups-containing component comprises monomer, oligomer or polymer molecules, or mixtures of one or more thereof, possessing on average at least two azetidinium groups per molecule, wherein said ink has a surface tension in the range of about 20 dyne/cm to about 70 dyne/cm at 25° C., and a viscosity of 30 cP or less at 25° C., and wherein
said ink does not contain a colorant.

2. The aqueous inkjet ink of claim 1, having a viscosity of less than about 7 cP at 25° C.

3. The aqueous inkjet ink of claim 1, wherein the azetidinium groups comprise at least two groups selected from the group consisting of Formula (II), Formula (III) and mixtures thereof:

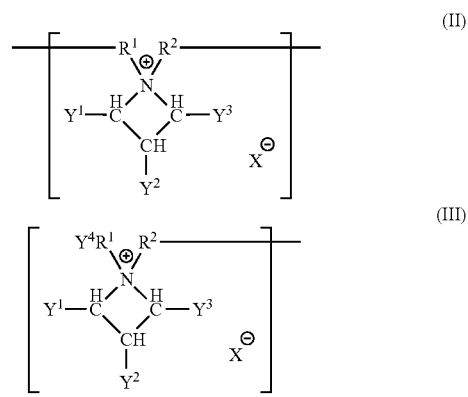

wherein:
$R^1$ and $R^2$ are independently an alkylene group containing 1 to 6 carbon atoms;
X is an anionic counterion;
$Y^1$, $Y^2$ and $Y^3$ are each independently selected from the group consisting of hydrogen, hydroxyl, halo, alkoxy, alkyl, amino, carboxy, acetoxy, cyano and sulfhydryl; and
$Y^4$ is a chain-terminating group.

4. An ink set comprising at least two inks, wherein:
at least one of the inks is a first aqueous inkjet ink comprising a first aqueous vehicle and an azetidinium groups-containing component dispersed and/or dissolved in the first aqueous vehicle, wherein the azetidinium groups-containing component comprises monomer, oligomer or polymer molecules, or mixtures of one or more thereof, possessing on average at least two azetidinium groups per molecule, and wherein the first aqueous ink has a surface tension in the range of about 20 dyne/cm to about 70 dyne/cm at 25° C., a viscosity of 30 cP or less at 25° C., and does not contain a colorant; and wherein at least one other ink is a second aqueous inkjet Ink comprising a second aqueous vehicle, a colorant and a co-reactive species dispersed and/or dissolved in the second aqueous vehicle, the co-reactive species comprising one or more moieties reactive with polyazetidinium groups.

5. The ink set of claim 4, comprising at least three differently colored inkjet inks, wherein:

at least one of the differently colored inkjet inks is the second aqueous inkjet ink at least one of the differently colored inkjet inks is a third aqueous inkjet ink comprising a third aqueous vehicle having dispersed and/or dissolved therein a colorant and a co-reactive species bomprising one or more moieties reactive with polyazetidinium groups; and at least one of the differently colored inkjet inks is a fourth aqueous inkjet ink comprising a fourth aqueous vehicle having dispersed and/or dissolved therein a colorant and a co-reactive species comprising one or more moieties reactrve with polyazetidinium groups.

6. A method for ink jet printing onto a substrate, comprising the steps of:

(a) providing an ink jet printer that is responsive to digital data signals;

(b) loading the printer with a substrate to be printed;

(c) loading the printer with an ink as set forth in any of claims 1, 2 and 3 or an inkjet ink set as set forth in any of claims 4 and 5; and (d) printing onto the substrate using the ink or inkjet ink set in response to the digital data signals.

7. The method of claim 6, wherein the substrate is plain paper.

8. The method of claim 6, wherein the substrate is a textile.

* * * * *